UNITED STATES PATENT OFFICE.

FREDERIC VILHELM BERG MEIDELL, OF COPENHAGEN, DENMARK.

IMPROVEMENT IN FILLINGS FOR FIRE-PROOF SAFES.

Specification forming part of Letters Patent No. 155,661, dated October 6, 1874; application filed August 10, 1874.

*To all whom it may concern:*

Be it known that I, FREDERIC VILHELM BERG MEIDELL, of Copenhagen, in the Kingdom of Denmark, have invented a new and Improved Filling for Fire-Proof Safes, of which the following is a specification:

This invention has for its object to produce a new filling for the walls of fire-proof safes, which will be cheap and durable, and effectually guard the contents of the safe against a severe fire.

The invention consists in compounding certain substances, in the manner hereinafter described.

The mixture I propose to use as filling for fire-proof safes consists of the following-named substances, taken in about the proportions named, to wit: Seven parts of chalk, one part of pipe-clay, and seven parts of sawdust, preferably that of beech-trees. To the above ingredients I add sufficient silicate of soda of about 30° Baumé to transform the whole mass into a pasty consistency.

This paste should be well kneaded, and is then allowed to evaporate in dry air at a temperature of about 59° Fahrenheit. The mass is then spread upon the inner lining of the safe, so as to obtain the requisite shape, and is then exposed to a gradually-increasing heat, and, finally, to a strong flame, which will turn the sawdust that is on the surface of the mixture into coal.

After the mass has been removed from the flames, and while it is gradually cooling, it is plunged into a bath of the silicate of soda, and is finally covered with a thin layer of rice-hulls, sawdust, or the like.

The finished preparation, after being completely cooled, will be found to be as hard as stone and an excellent non conductor of heat. It may either be placed within the walls of the safe, so as to completely fill the space between them, or it may be applied in layers, so that air-spaces will be left between every pair of layers, and between the layers and the walls of the safe.

I claim as my invention—

The filling for fire-proof safes composed of chalk, clay, sawdust, and silicate of soda, substantially as specified.

In testimony whereof I have signed my name to this specification in the presence of the subscribing witnesses.

F. V. B. MEIDELL.

Witnesses:
 A. STEINBERG,
 J. METHLING.